(12) United States Patent
Jain

(10) Patent No.: US 7,962,772 B2
(45) Date of Patent: Jun. 14, 2011

(54) BACKUP POWER SYSTEM AND METHOD

(75) Inventor: Deepak K. Jain, Beltsville, MD (US)

(73) Assignee: Ainet Registry, LLC, Beltsville, MD (US)

( * ) Notice: Subject to any disclaimer, the term of this patent is extended or adjusted under 35 U.S.C. 154(b) by 798 days.

(21) Appl. No.: 12/027,682

(22) Filed: Feb. 7, 2008

(65) Prior Publication Data

US 2010/0235671 A9    Sep. 16, 2010

(51) Int. Cl.
   *G06F 1/26*    (2006.01)
(52) U.S. Cl. ....................................... 713/300
(58) Field of Classification Search ................... 713/300
   See application file for complete search history.

(56) References Cited

U.S. PATENT DOCUMENTS

| | | |
|---|---|---|
| 4,167,680 A | 9/1979 | Gross |
| 4,203,041 A | 5/1980 | Sachs |
| 4,262,212 A | 4/1981 | Jacob |
| 4,313,060 A | 1/1982 | Fickenscher |
| 4,315,163 A | 2/1982 | Bienville |
| 4,400,626 A | 8/1983 | Lacy |
| 4,401,895 A | 8/1983 | Petkovsek |
| 4,405,867 A | 9/1983 | Moakler |
| 4,406,950 A | 9/1983 | Roesel, Jr. |
| 4,412,170 A | 10/1983 | Roesel, Jr. |
| 4,426,587 A * | 1/1984 | Nouet .............................. 307/66 |
| 4,460,834 A | 7/1984 | Gottfried |
| 4,471,233 A | 9/1984 | Roberts |
| 4,673,826 A | 6/1987 | Masson |
| 4,675,539 A | 6/1987 | Nichol |
| 4,686,375 A | 8/1987 | Gottfried |
| 4,686,379 A | 8/1987 | Ohnari |
| 5,198,698 A | 3/1993 | Paul |
| 5,307,480 A | 4/1994 | Hwang |

(Continued)

FOREIGN PATENT DOCUMENTS

WO    95/34933 A1    12/1995

OTHER PUBLICATIONS

International Preliminary Examination Report for PCT International Patent Application No. PCT/US2009/033334, mailed on May 26, 2010.

(Continued)

*Primary Examiner* — Thomas Lee
*Assistant Examiner* — Eric Chang
(74) *Attorney, Agent, or Firm* — Pillsbury Winthrop Shaw Pittman LLP

(57) ABSTRACT

Various embodiments of a backup power system and method may include a transfer switch, connections to primary and secondary power sources, a stored energy component, and an interconnected controller with a processor and memory. The transfer switch may provide power to an external load from a selected one of the primary power source, the secondary power source, or the stored energy component. The controller may compare energy stored within the stored energy component against a first threshold relating to a maximum time necessary for the secondary power source to at least reach a predetermined minimum output level, and also to compare the stored energy level to a second threshold greater than the first threshold. The second threshold may be selected to reduce a number of on/off cycles of the secondary power source during periods of intermittent primary power fluctuation that are less severe than a prolonged loss of power.

37 Claims, 4 Drawing Sheets

U.S. PATENT DOCUMENTS

| | | |
|---|---|---|
| 5,332,927 A | 7/1994 | Paul |
| 5,471,114 A | 11/1995 | Edwards |
| 5,483,108 A | 1/1996 | Girard |
| 5,532,525 A * | 7/1996 | Kaiser et al. .................... 307/64 |
| 5,642,004 A | 6/1997 | Bircher |
| 5,646,458 A | 7/1997 | Bowyer |
| 5,686,768 A | 11/1997 | Thomsen |
| 5,734,204 A | 3/1998 | Sobue |
| 5,767,591 A | 6/1998 | Pinkerton |
| 5,790,391 A * | 8/1998 | Stich et al. ...................... 363/24 |
| 5,844,327 A | 12/1998 | Batson |
| 5,850,136 A * | 12/1998 | Kaneko ........................ 320/119 |
| 5,929,538 A | 7/1999 | O'Sullivan |
| 5,939,799 A | 8/1999 | Weinstein |
| 5,939,801 A | 8/1999 | Bouffard |
| 5,994,794 A | 11/1999 | Wehrlen |
| 6,134,124 A | 10/2000 | Jungreis et al. |
| 6,175,166 B1 | 1/2001 | Bapat |
| 6,181,028 B1 | 1/2001 | Kern |
| 6,184,593 B1 | 2/2001 | Jungreis |
| 6,304,005 B1 | 10/2001 | Aoki |
| 6,304,006 B1 | 10/2001 | Jungreis |
| 6,433,444 B1 | 8/2002 | De Vries |
| 6,486,627 B1 | 11/2002 | Gabrys |
| 6,559,559 B2 | 5/2003 | Cratty |
| 6,593,670 B2 | 7/2003 | Anderson |
| 6,657,320 B1 | 12/2003 | Andrews |
| 6,700,802 B2 | 3/2004 | Ulinski |
| 6,737,762 B2 | 5/2004 | Koenig |
| 6,854,065 B2 | 2/2005 | Smith |
| 6,868,310 B2 | 3/2005 | Nasman |
| 7,005,760 B2 | 2/2006 | Eaton |
| 7,036,035 B2 | 4/2006 | Allison |
| 7,119,450 B2 | 10/2006 | Albrecht |
| 7,180,210 B1 | 2/2007 | Jorgenson |
| 7,183,668 B2 | 2/2007 | Ogawa |
| 7,265,458 B2 | 9/2007 | Edelen |
| 7,339,353 B1 * | 3/2008 | Masias et al. .................. 320/138 |
| 2003/0137196 A1 | 7/2003 | Liran |
| 2003/0173828 A1 | 9/2003 | Bachinski |
| 2004/0084965 A1 | 5/2004 | Welches |
| 2005/0184594 A1 | 8/2005 | Fredette |
| 2006/0192433 A1 | 8/2006 | Fuglevand et al. |
| 2006/0192435 A1 | 8/2006 | Parmley |
| 2006/0290205 A1 | 12/2006 | Heber |
| 2007/0052292 A1 | 3/2007 | Musselman |
| 2007/0055409 A1 | 3/2007 | Rasmussen |
| 2007/0132317 A1 | 6/2007 | Willets |

OTHER PUBLICATIONS

International Search Report and Written Opinion for PCT International Patent Application No. PCT/US2009/033334, mailed on Aug. 31, 2009.

* cited by examiner

BACKUP POWER SYSTEM AND METHOD

BACKGROUND

This application is generally directed to a stored energy system and method and, in one or more embodiments, is particularly directed to a backup power system, a controller useful therein, and a method for providing backup power having application, for example, in support of a computer system or other devices that require a stable source of electrical power for continuous, uninterrupted operation and protection of sensitive electronic components.

Conventional emergency and redundant power systems supporting offline or near-line cogeneration or emergency standby generation are generally limited in their ability to meet end-users' goal of continuous, interruptible power. Such conventional systems typically employ a primary utility feed, a transfer switch and, on the other switched side of the transfer switch, a generator powered by a prime mover, e.g., a diesel engine.

The output of the transfer switch typically feeds an uninterruptible power supply (UPS) or other stored energy system (e.g., a mechanical flywheel). Transfer switch logic may be designed to power up and switch to the generator when the utility mains fail for longer than a specified amount of time. After utility power has been restored for a sufficient period of time, the transfer switch is designed to switch back to the utility mains or primary source of power. The stored energy system may provide power and energy shaping in the time gaps or interruptions between generator fire-up, as well as during the transfer switch switching delay.

As the electrical supply grid becomes more complex with multiple energy providers, multiple grids, and increased loading, a number of failures less than a total outage during a single fault event often occur. For example, during failure of a transformer or during a series of lightning strikes in the power grid, power may intermittently disappear and reappear on the utility feed several times within a short period of time. Such intermittent power outages may be a precursor to a total power failure, or may damage electronic equipment fed by the grid.

This kind of cycling effect can not only result in power spikes that can damage sensitive electronic equipment, it can drain a stored energy system without allowing sufficient time to recharge between hits. If this sort of event occurs and the stored energy system does not have enough energy to handle the delay for the generator to achieve full power, the end-user's power source will see an interruption and potential damage to components or interruption of service often results.

SUMMARY

Among other things, this disclosure provides embodiments of a system and method that provides a source of backup or emergency power to a device or system in which stored energy levels of a stored energy component are monitored, for example, an uninterruptible power supply (UPS) or other electro-chemical arrangement (e.g., battery or fuel-cell), or an electro-mechanical flywheel arrangement. In other embodiments, a controller that is useful in controlling emergency or backup transfer of power to a load is disclosed, as is a computer program product that contains a computer-readable medium with computer instructions thereon that are useful in programming a computer or processor to carry out functions that control the emergency or backup transfer of power to a load.

In one exemplary embodiment using a generator as a secondary power source, a stored energy level in the stored energy component is compared against two thresholds. The first threshold may be defined as an amount of energy required by the device or system for which backup power is being provided (plus an additional margin, as desired) over the period of time that it takes a backup generator, for example, to reach full output. Alternatively, the first threshold may be expressed as the time that it takes the backup generator to come up to speed and reach full output capacity.

A second threshold may be defined as a number greater than the first threshold, and which is selected to minimize a number of starts and stops of the generator. Alternatively, the margin provided by the first threshold may be defined as a safe minimum level for operating the stored energy system without causing damage.

The system may include a data communication system between the stored energy system and the transfer switch and/or the generator or other secondary power source. The system thus only starts the generator when it is necessary, and is also capable of starting the generator in advance of a predicted need, thus providing uninterrupted power.

In one embodiment, a backup power system may include a secondary power source; a stored energy component capable of storing energy therein; and a controller in data communication with the secondary power source and the stored energy component. The controller may be configured to compare a measured energy level of energy stored within the stored energy component against a first threshold relating to a maximum time necessary for the secondary power source to at least reach a predetermined minimum output level. Further, the controller may be configured to compare the stored energy level to a second threshold greater than the first threshold. The second threshold may be selected so as to reduce a number of on/off cycles of the secondary power source during periods of intermittent power fluctuation of the primary power source that are less severe than a prolonged full power loss by the primary power source. In a related aspect, the system may also include a transfer switch electrically connectable to a primary power source and electrically connected to the secondary power source. The controller may also be operatively connected to the transfer switch.

In another embodiment, a method of making backup power available for a load that receives normal power from a primary power source includes providing a secondary power source; providing a stored energy component; monitoring a stored energy level within the stored energy component; comparing the monitored stored energy level to a first threshold relating to a maximum time necessary for the secondary power source to at least reach a predetermined minimum output level; and comparing the stored energy level to a second threshold greater than the first threshold, said second threshold being selected so as to reduce a number of on/off cycles of the secondary power source during periods of intermittent power fluctuation of the primary power source that are less severe than a prolonged full power loss by the primary power source. In response to one or more comparison results, power may be selectively transferred to the load from one of the primary power source, secondary power source, and the stored energy component.

In another embodiment, a computer program product comprising a computer-readable readable medium has computer instructions thereon which, when executed by a computer, cause various functions to be carried out by the computer, including, for example to compare a stored energy level in a stored energy element to a first threshold relating to a maximum time necessary for a secondary power source to at least reach a predetermined minimum output level; to compare the stored energy level to a second threshold greater than the first threshold, said second threshold being selected so as to reduce a number of on/off cycles of the secondary power source during periods of intermittent power fluctuation of a primary power source that are less severe than a prolonged full power loss by the primary power source; and in response to one or more comparison results, generate one or more signals useful in commanding a selective transfer of power to a load from one of the primary power source, the secondary power source, and the stored energy component.

In another embodiment, a controller useful in selecting a source of power provided to a load includes one or more processors arranged to receive one or more parameters relating to a primary power source, a secondary power source, and a stored energy component. A memory may be operatively connected to the processor which may be configured, inter alia, to compare a measured energy level representing energy stored within the stored energy component against a first threshold stored in the memory. The first threshold may relate to a maximum time necessary for the secondary power source to at least reach a predetermined minimum output level. The processor may further compare the measured energy level to a second threshold stored in the memory. The second threshold may be greater than the first threshold and selected so as to reduce a number of on/off cycles of the secondary power source during periods of intermittent power fluctuation of the primary power source that are less severe than a prolonged full power loss by the primary power source. In response to one or more comparison results, the processor may selectively provide one or more signals that command power to be provided or transferred to the load from one of a primary power source, the secondary power source, and the stored energy component.

In another aspect of this embodiment, the processor may selectively command power to be provided to the stored energy component via one or more control signals if the measured energy level is less than the second threshold.

DETAILED DESCRIPTION

Figure 1:
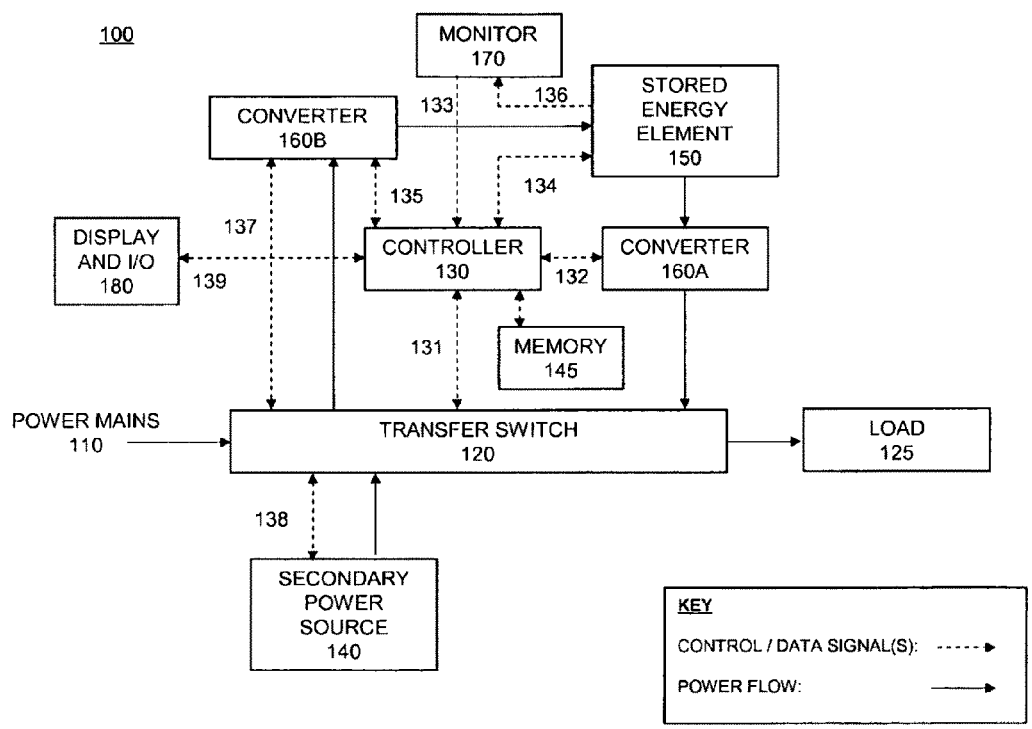
FIG. 1 provides a block diagram of an exemplary embodiment of a backup power system.

Turning now to the Drawings, FIG. 1 provides a block diagram of an embodiment of a backup power system 100. The solid lines represent power flow (with unidirectional flow) and the dashed lines represent data and/or control signal paths (with exemplary unidirectional or bi-directional data flow directions indicated by the arrows). Power mains 110 may represent utility power or some other source of primary ("normal") power for load 125, e.g., single or 3-phase AC power at a standard voltage. For some applications, primary power could be in the form of DC power. Power mains 110 may be connected to load 125 through transfer switch 120. In a normal mode of operation, transfer switch 120 may directly connect power mains 110 to load 125 without further processing or switching.

Controller 130 may be arranged to monitor various parameters and voltages in system 100, and may be implemented by a personal computer, or some other known processor or multiprocessor configuration running computer software or firmware code appropriate to carry out the various control and data functions described herein. Data and/or control signals may be communicated between transfer switch 120 and controller 130 over link 131. The various control/data signal interconnections represented by links 131 through 138 may be made by conventional wired interfaces, or may be implemented by known wired or wireless techniques. Alternatively, controller 130 may be implemented in analog form appropriate in sensing and/or setting various thresholds of interest, for example, by use of one or more potentiometers and comparator circuitry.

Memory 145 may be coupled to controller 130 in a known manner for storing data representing, for example, various operating parameters of system 100, including, but not limited to an energy storage condition of stored energy element 150, a status of secondary power source 140, and particular threshold values useful in making power transfer decisions. In the case of an analog implementation, memory 145 might not be necessary or desired.

Secondary power source 140 is shown connected to transfer switch 120, and may be a standby generator (e.g., a common diesel or gas turbine generator), or an electro-chemical arrangement such as a battery with appropriate conversion circuitry to convert from a DC voltage to an appropriate AC and/or DC voltage, as needed. Control/data path 138 may be used to control secondary power source 140, and/or to obtain status information from secondary power source 140, which may be used by transfer switch 120, or which may be relayed directly or indirectly to controller 130 via link 131.

Stored energy element 150 may be coupled to transfer switch 120 (e.g., through converter 160A), and may be viewed as an "emergency" backup power source in the event that the secondary power source is unavailable to provide power to load 125 when primary power (e.g., power mains 110 or other source of "normal" power) is unavailable or unreliable. Alternatively, the output of converter 160A may be directly coupled to load 125 and not be directly connected to transfer switch 120 (not shown in FIG. 1). Continuing with FIG. 1, one or two-way data/control signal communication between controller 130 and stored energy element 150 may be provided by link 134. Stored energy element 150 may include a flywheel or other kinetic energy system, or it may be a battery system such as an uninterruptible power supply (UPS). Depending on the type of energy stored in stored energy element 150, converters 160A and 160B may be useful to convert the form of energy stored in stored energy element 150 into a form that is useful for load 125.

For example, if stored energy element 150 is a flywheel that "stores" the kinetic energy of the rotating flywheel, converter 160A may include a generator arrangement configured to convert kinetic energy of the flywheel into electric power in a form that is useful for load 125 by AC-DC or AC-DC-AC conversion, depending upon the frequency and voltage required for load 125. If stored energy element 150 is a battery, for example, converter 160A may be a DC-AC (or DC-AC-DC) converter arrangement to convert DC from the battery into AC or DC power as necessary to satisfy the requirements of load 125. Converter 160A may provide or exchange data and/or control signals with controller 130 via link 132.

Converter 160B may be used when restoring the energy in stored energy element 150 to a desired level. For example, if stored energy element 150 is a battery and primary power is AC power, converter 160B may convert AC power received through transfer switch 120 to DC power such that the battery can recharge. If stored energy element 150 is a flywheel, for example, then converter 160B may include circuitry and/or components that would act to restore the rotational speed of the flywheel up to a nominal idle or standby speed so that the kinetic energy "stored" in the spinning flywheel is at a desired level. Converter 160B may provide or exchange data and/or control signals with controller 130 via link 135 and with transfer switch 120 via link 137.

Monitor 170 may be used to monitor the level of energy stored in stored energy element 150, and may obtain operating parameters of stored energy element 150 via link 136. Monitor 170 may be built-in or integral with stored energy element 150, with a conventional data interface/link 136. If stored energy element 150 is a battery, for example, monitor 170 may be configured to assess the remaining charge in the battery, and to communicate various system and/or component parameters with controller 130 via link 133.

A display and various input/output (I/O) devices may be interfaced with controller 130 in a known way to display and/or input information regarding various components and/or parameters of system 100 or to reconfigure system 100, as represented by display and I/O 180, interfaced with controller 130 via link 139. For example, various thresholds useful in making power transfer decisions may be input into memory 145 via controller 130 and representations thereof may be displayed to an operator using I/O functionality in display and I/O 180.

Various aspects of the system embodiment above will now be discussed with respect to FIG. 1. In one aspect, backup power system 100 includes secondary power source 140, stored energy component 150 capable of storing energy in one form or another, and controller 130 which is in data communication (e.g., using data/control lines 131, 134) with secondary power source 140 and stored energy component or element 150.

Controller 130 may be configured, inter alia, to compare a measured energy level of energy stored within stored energy component 150 against a first threshold (e.g., E1 or T1) relating to a maximum time necessary for secondary power source 140 to at least reach a predetermined minimum output level. Further, controller 130 may be configured to compare the stored energy level to a second threshold (e.g., E2 or T2) greater than the first threshold. The second threshold may be selected so as to reduce a number of on/off cycles of secondary power source 140 during periods of intermittent power fluctuation of primary power source/power mains 110 that are less severe than a prolonged or complete power loss by primary power source 110.

In this embodiment, controller 130 may be controlled and arranged so as to selectively provide power to external load 125 from one of primary power source 110, secondary power source 140, and stored energy component 150 in response to one or more comparison results made by controller 130, e.g., comparing the stored energy level to one or more predetermined thresholds, or to thresholds that are changed in response to dynamic events occurring in or otherwise affecting system 100. In a related aspect, controller 130 and transfer switch 120 may be configured to provide power to external load 125 from stored energy component 150 during periods of intermittent power fluctuation, for example, when a voltage of power mains 110 is fluctuating or is otherwise abnormal, i.e., where the voltage is spiking and/or sagging.

In a further aspect of this embodiment, transfer switch 120 is capable of being electrically connected to primary power source 110 and secondary power source 140, and operation of transfer switch 120 may be directly or indirectly controlled or commanded by controller 130 so as to provide power to external load 125 from a selected one of primary power source 110, secondary power source 140, and stored energy component 150.

In another aspect, controller 130 and transfer switch 120 are configured to selectively restore the stored energy level in stored energy component 150 to at least the second threshold in response to a comparison result indicating that the stored energy level is less than the second threshold. This may be accomplished, for example, by operatively connecting secondary power source 140 to stored energy component 150 or, in another aspect, the stored energy level in stored energy component 150 may be restored, at least in part, by operatively connecting primary power source 110 to stored energy component 150 (via transfer switch 120, for example).

In a further aspect, controller 130 and transfer switch 120 are configured to selectively restore the stored energy level in stored energy component 150 to a predetermined energy level greater than the second threshold, i.e., to a level closer to a "full" level and, this may be done by using secondary power source 140. This could be considered to be a "third threshold". Additional thresholds may be used to suit the particular operational needs for the system. In another aspect of this embodiment, secondary power source 140 may provide power to external load 125 through transfer switch 120.

Further, and in response to an indication that the stored energy level in stored energy component 150 is not greater than the first threshold, the controller may be configured to energize secondary power source 140.

Additionally, controller 130 may be configured to energize secondary power source 140 if primary power source 110 is not available, or is deemed to be unreliable or providing power of unacceptable quality for a particular type of load 125 being energized.

In another aspect, and in response to an indication that the stored energy level is greater than the second threshold, controller 130 may be configured to place secondary power source 140 in a standby mode.

System 100 may also include memory 145 operably connected to controller 130, and configured to at least store the first and second thresholds. Further, system 100 may also include a display and at least one input/output device operably connected to said controller, e.g., a keyboard and/or mouse, and other conventional peripheral equipment.

In an embodiment where secondary power source 140 is a generator, and assuming that the generator subsystem were energized or activated in advance of another outage (after stored energy component 150 fell below a first threshold), and allowed to stay running until stored energy component 150 reached a minimum acceptable level of power (i.e., a second threshold greater than the first threshold) a user's exposure to and concerns relating to power interruption in load 125 approaches zero.

Figure 3A:
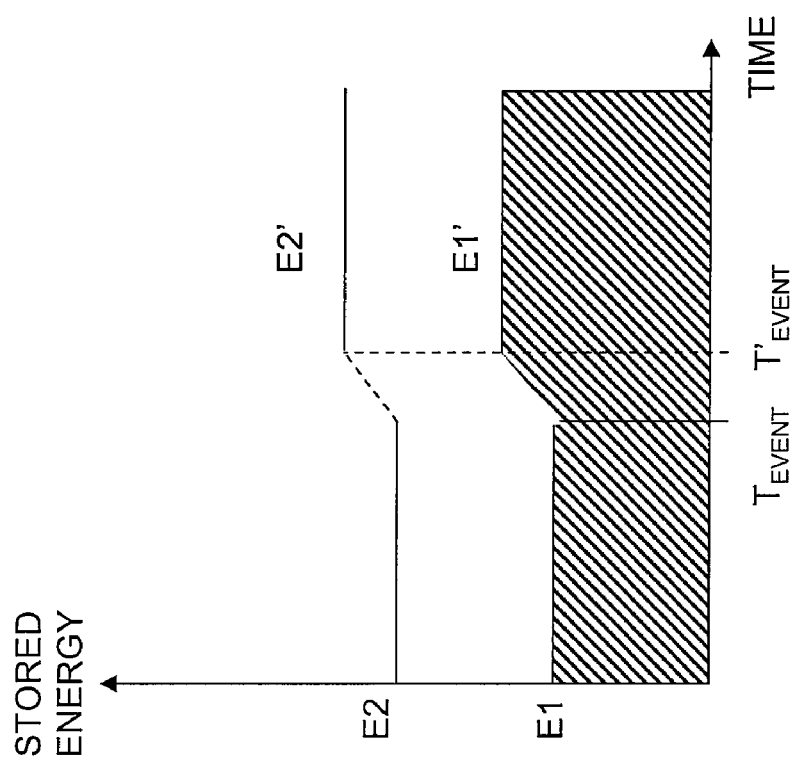
FIG. 3A graphically depicts various thresholds useful in the system of FIG. 1 and the method of FIG. 2, and FIG. 3B provides an alternative representation of various thresholds useful in the system of FIG. 1 and the method of FIG. 2.
Figure 3B:
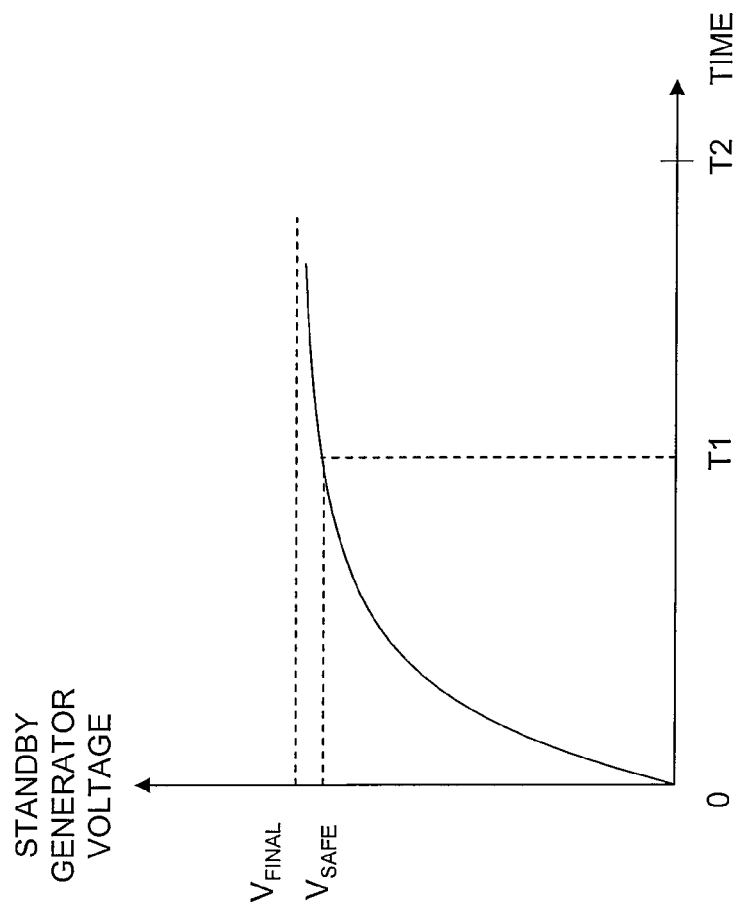

FIG. 3B depicts an exemplary implementation of the two thresholds mentioned above. The first threshold, e.g., T1, could be defined as the time it takes the generator subsystem to reach full potential plus some sufficient margin (e.g., "$V_{SAFE}$"). Alternatively, this additional margin could be defined as a safe minimum level for stored energy system 150 to be maintained at without causing damage to a connected load 125.

The second threshold, e.g., T2, could be defined as a time greater than T1 and designated as 100% capacity of stored energy system 150 (e.g., "$V_{FINAL}$"), but could be judiciously chosen to minimize the number of starts/stops of the generator subsystem. For example, if T2 is chosen to be too close in value to T1, the generator subsystem, or more broadly, secondary power source 140, will be cycled on and off too frequently, leading to possible degradation of its capacity to be available when secondary power is needed for load 125, as well as causing undesirable wear and tear on various electromechanical components that might be contained therein.

FIG. 3A provides an alternative view of the first and second thresholds. In this depiction, measured in units of energy, E1 and E2, E1 corresponds to the minimum energy necessary to be stored in stored energy element 150 for provision to load 125 during the time that the generator subsystem takes to reach a full potential plus some sufficient margin, for example, "$V_{SAFE}$". E2 corresponds to an energy level necessary to be stored in stored energy element 150 for possible provision to load 125 during the longer period of time that the generator subsystem may take to reach a final voltage, for example, "$V_{FINAL}$".

FIG. 3A goes on to illustrate that the thresholds E1 and E2 (T1 and T2) may be dynamic values, depending on a particular load 125 being supplied, the history or future projections of the stability, availability of power mains 110, or due to degradation of secondary power source 140 and/or stored energy element 150, or some other quantifiable degrading effect on the conversion efficiency of system 100 in a backup power mode. Dynamic thresholds E1' and E2' illustrate an increase of the threshold related to the occurrence of an event at time $T_{EVENT}$, which has stabilized at a higher threshold value at later time T'EVENT. The threshold values may increase or decrease, and may be input into system 100 by display I/O device(s) 180 due to an event in system 100, gradual degradation of system components, or by operator preference.

Figure 2:
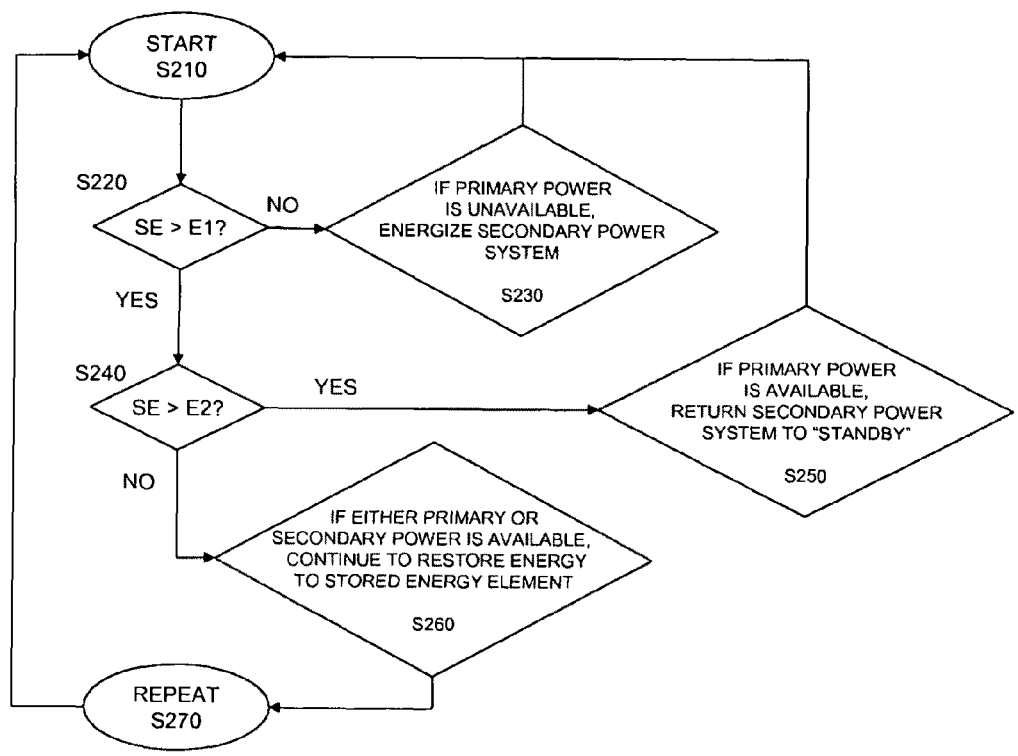
FIG. 2 provides a process flowchart illustrating exemplary logical flow of a method for providing backup power.

Another embodiment of this disclosure is provided in FIG. 2, in which a method for providing backup power is illustrated. In this embodiment, the process starts at step S210, and proceeds to step S220 where a decision is made as to whether the level of stored energy (SE) in stored energy element 150 is greater than first threshold, E1. If not, then step S230 energizes secondary power system 140 if primary power 110 is not available. The stored energy level SE may be restored by primary power 110, is such power is available, without the need for energizing secondary power system 140.

If SE>E1, then a further determination is made at step S240 whether SE>E2. If this logical condition is true, and if primary power is available, then secondary power system 140 is returned to a "standby" condition at step S250. Otherwise, i.e., if E1<SE≦E2, then, at step S260, energy is continued to be restored to stored energy element 150 if either primary or secondary power is available. The process repeats at step S270 by returning to step S210.

In related aspects of this embodiment, and as illustrated by the flowchart of FIG. 2, a method of making backup power available for a load that receives normal power from a primary power source 110 includes providing secondary power source 140; providing stored energy component 150; monitoring a stored energy level within stored energy component 150; comparing the monitored stored energy level to a first threshold (E1) relating to a maximum time and/or energy level necessary for the secondary power source to at least reach a predetermined minimum output level; and comparing the stored energy level to a second threshold (E2) greater than the first threshold (E1). The second threshold E2 may be selected so as to reduce a number of on/off cycles of secondary power source 140 during periods of intermittent power fluctuation of primary power source 110 that are less severe than a prolonged full power loss by the primary power source. Further, and in response to one or more comparison results, power may be selectively transferred to load 125 from one of the primary power source 110, secondary power source 140, and stored energy component 150.

In a further aspect of the embodiment, power may be selectively transferred to load 125 from stored energy component 150 during periods of intermittent power fluctuation. Further, the stored energy level in stored energy component 150 may be selectively restored to at least the second threshold in response to a comparison result indicating that the stored energy level is less than the second threshold. The stored energy level in stored energy component 150 may be selectively restored by transferring power from secondary power source 140 to stored energy component 150. Alternatively, the stored energy level in stored energy component 150 may be selectively restored by transferring power from primary power source 110 to stored energy component 150, and may be further restored to a predetermined energy level greater than the second threshold, for example, to full capacity or to some other level greater than the second threshold and less than full capacity.

In a related aspect, power may be selectively transferred to load 125 from secondary power source 140. An aspect of the method may include energizing the secondary power source in response to an indication that said stored energy level is not greater than the first threshold, and/or the secondary power source may be energized if normal power received from the primary power source is not available. In a further aspect, the secondary power source may be in a standby mode in response to an indication that the stored energy level is greater than the second threshold.

In one or more embodiments, the first and second thresholds may be stored in a memory operably connected to a processor, and a status or other system-related information may be displayed, for example, an operational status of the secondary power source and the stored energy component may be displayed. As mentioned above, in the case of an analog controller 130, the thresholds may be implemented by appropriate analog circuitry that establishes the desired thresholds in terms of voltages, for example.

In another embodiment, computer instructions may be encoded onto a computer-readable readable medium having computer-readable program code embodied therein (e.g., floppy disk, CD, or firmware) for causing a computer to control power transfer to a load from one or more sources of power. Upon execution by the computer, the computer-readable code may cause the computer, inter alia, to compare a stored energy level in a stored energy element to a first threshold relating to a maximum time necessary for a secondary power source to at least reach a predetermined minimum output level. In addition, the computer may also compare the stored energy level to a second threshold greater than the first threshold. The second threshold may be selected so as to reduce a number of on/off cycles of the secondary power source during periods of intermittent power fluctuation of a primary power source that are less severe than a prolonged full power loss by the primary power source. In response to one or more comparison results, the computer may then be instructed to generate one or more signals useful in commanding a selective transfer of power to a load from one of the primary power source, the secondary power source, and the stored energy component. In a further aspect of this embodiment, the computer code may cause the computer to monitor a stored energy level within the stored energy component.

In another embodiment, controller 130 is configured to be useful in selecting a source of power provided to load 125, and may include one or more processors arranged to receive one or more parameters relating to primary power source 110, secondary power source 140, and stored energy component 150. Memory 145 may be operatively connected to the processor, and the processor may be configured to compare a measured energy level representing energy stored within stored energy component 150 against a first threshold (e.g., T1 or E1) stored in memory 145.

As discussed above, the first threshold may relate to a maximum time necessary for secondary power source 140 to at least reach a predetermined minimum output level. The processor may also compare the measured energy level to a second threshold (e.g., E2 or T2) stored in memory. The second threshold may be greater than the first threshold and selected so as to reduce a number of on/off cycles of secondary power source 140 during periods of intermittent power fluctuation of primary power source 110 that are less severe than a prolonged full power loss by primary power source 110.

In response to one or more comparison results, the processor may selectively provide one or more signals that command power to be provided to load 125 from one of primary power source 110, secondary power source 140, and stored energy component 150. In another aspect of this embodiment, the processor may selectively command power to be provided to stored energy component 150 if the measured energy level is less than the second threshold.

The above-described embodiments are merely exemplary in nature, and are not intended to limit the scope of the inventive concept as set forth in the following claims.

What is claimed is:

1. A backup power system, the system comprising:
   a secondary power source;
   a stored energy component capable of storing energy therein; and
   a controller in data communication with the secondary power source and the stored energy component,
   wherein said controller is configured to:
      compare a measured energy level of energy stored within the stored energy component against a first threshold relating to a maximum time necessary for the secondary power source to at least reach a predetermined minimum output level, and
      compare the stored energy level to a second threshold greater than the first threshold, said second threshold being selected so as to reduce a number of on/off cycles of the secondary power source during periods of intermittent power fluctuation of the primary power source that are less severe than a prolonged full power loss by the primary power source,
   said controller being controlled and arranged so as to selectively provide power to an external load from one of a primary power source, the secondary power source, and the stored energy component in response to one or more comparison results.

2. The system of claim 1, further comprising a transfer switch electrically connectable to the primary power source and electrically connected to the secondary power source, wherein an operation of said transfer switch is controlled by the controller so as to provide power to the external load from a selected one of the primary power source, the secondary power source, and the stored energy component.

3. The system of claim 1, wherein said controller is configured to provide power to said external load from the stored energy component during said periods of intermittent power fluctuation.

4. The system of claim 1, wherein said controller is configured to selectively restore the stored energy level in the stored energy component to at least the second threshold in response to a comparison result indicating that the stored energy level is less than the second threshold.

5. The system of claim 4, wherein said stored energy level in the stored energy component is restored by operatively connecting the secondary power source to the stored energy component.

6. The system of claim 4, wherein said stored energy level in the stored energy component is restored, at least in part, by operatively connecting the primary power source to the stored energy component.

7. The system of claim 4, wherein said controller is configured to selectively restore the stored energy level in the stored energy component to a predetermined energy level greater than the second threshold.

8. The system of claim 7, wherein said controller is configured to restore the stored energy level in the stored energy component to the predetermined energy level by using the secondary power source.

9. The system of claim 8, wherein the secondary power source provides power to the external load through a transfer switch.

10. The system of claim 1, wherein, in response to an indication that said stored energy level is not greater than the first threshold, said controller provides one or more signals that energize said secondary power source.

11. The system of claim 1, wherein said controller is configured to provide one or more signals that energize said secondary power source if said primary power source is not available.

12. The system of claim 1, wherein, in response to an indication that said stored energy level is greater than the second threshold, said controller is configured to provide one or more signals that place said secondary power source in a standby mode.

13. The system of claim 1, further comprising a memory operably connected to said controller, said memory being configured to at least store the first and second thresholds.

14. The system of claim 1, further comprising a display and at least one input/output device operably connected to said controller.

15. The system of claim 1, wherein the first threshold is selected so as to ensure that the secondary power source may be brought into service to power the load using less than an amount of power remaining in the stored energy component.

16. A method of making backup power available for a load that receives normal power from a primary power source, the method comprising:
   comparing a stored energy level in a stored energy component to a first threshold relating to a maximum time necessary for a secondary power source to at least reach a predetermined minimum output level;
   comparing the stored energy level to a second threshold greater than the first threshold, said second threshold being selected so as to reduce a number of on/off cycles of the secondary power source during periods of intermittent power fluctuation of the primary power source that are less severe than a prolonged full power loss by the primary power source; and
   in response to one or more comparison results, selectively commanding a transfer of power to the load from one of the primary power source, secondary power source, and the stored energy component.

17. The method of claim 16, further comprising providing a secondary power source.

18. The method of claim 16, further comprising providing a stored energy component.

19. The method of claim 16, further comprising monitoring a stored energy level within the stored energy component.

20. The method of claim 16, further comprising selectively transferring power to said load from the stored energy component during said periods of intermittent power fluctuation.

21. The method of claim 16, further comprising selectively restoring the stored energy level in the stored energy component to at least the second threshold in response to a comparison result indicating that the stored energy level is less than the second threshold.

22. The method of claim 21, wherein said selectively restoring the stored energy level in the stored energy component comprises transferring power from the secondary power source to the stored energy component.

23. The method of claim 21, wherein said selectively restoring the stored energy level in the stored energy component comprises transferring power from the primary power source to the stored energy component.

24. The method of claim 21, wherein said selectively restoring the stored energy level in the stored energy component comprises restoring the stored energy level to a predetermined energy level greater than the second threshold.

25. The method of claim 21, wherein power is selectively transferred to the load from the secondary power source.

26. The method of claim 16, further comprising energizing said secondary power source in response to an indication that said stored energy level is not greater than the first threshold.

27. The method of claim 16, further comprising energizing said secondary power source if said normal power from said primary power source is not available.

28. The method of claim 16, further comprising placing said secondary power source in a standby mode in response to an indication that said stored energy level is greater than the second threshold.

29. The method of claim 16, further comprising storing at least store the first and second thresholds in a memory operably connected to a processor.

30. The method of claim 16, further comprising displaying a system status.

31. The method of claim 30, wherein said displaying a system status comprises displaying at least an operational status of the secondary power source and the stored energy component.

32. The method of claim 16, further comprising selecting the first threshold so as to ensure that the secondary power source may be brought into service to power the load using less than said stored energy level in the stored energy component.

33. An article of manufacture, comprising:
a computer-readable medium having computer readable program code embodied therein for causing a computer to control power transfer to a load from one or more sources of power, wherein, upon execution by the computer, the computer-readable program code in said article of manufacture causes the computer to:
compare a stored energy level in a stored energy element to a first threshold relating to a maximum time necessary for a secondary power source to at least reach a predetermined minimum output level;
compare the stored energy level to a second threshold greater than the first threshold, said second threshold being selected so as to reduce a number of on/off cycles of the secondary power source during periods of intermittent power fluctuation of a primary power source that are less severe than a prolonged full power loss by the primary power source; and
in response to one or more comparison results, generate one or more signals useful in commanding a selective transfer of power to a load from one of the primary power source, the secondary power source, and the stored energy component.

34. The article of manufacture of claim 33, further comprising computer-readable program code which, when executed by the computer, causes the computer to monitor a stored energy level within the stored energy component.

35. A controller useful in selecting a source of power provided to a load, the controller comprising:
a processor arranged to receive one or more parameters relating to a primary power source, a secondary power source, and a stored energy component; and
a memory operatively connected to the processor;
wherein said processor is configured to:
compare a measured energy level representing energy stored within the stored energy component against a first threshold stored in said memory, said first threshold relating to a maximum time necessary for the secondary power source to at least reach a predetermined minimum output level; and
compare the measured energy level to a second threshold stored in said memory, said second threshold being greater than the first threshold and selected so as to reduce a number of on/off cycles of the secondary power source during periods of intermittent power fluctuation of the primary power source that are less severe than a prolonged full power loss by the primary power source,
wherein, in response to one or more comparison results, said processor selectively provides one or more signals that command power to be provided to the load from one of a primary power source, the secondary power source, and the stored energy component.

36. The controller of claim 35, wherein, via said one or more signals, said processor selectively commands power to be provided to the stored energy component if the measured energy level is less than the second threshold.

37. The controller of claim 35, wherein said first and second thresholds may be changed in said memory through a user interface.

* * * * *